(12) United States Patent
Kim et al.

(10) Patent No.: US 7,034,440 B2
(45) Date of Patent: Apr. 25, 2006

(54) GENERATOR FOR USE WITH A MICRO SYSTEM HAVING DUAL DIAPHRAGMS

(75) Inventors: Kwang Ho Kim, Seoul (KR); Gwi-Eun Song, Gwacheon-si (KR); Jae Hak Jeon, Seoul (KR); Yoon Pyo Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 191 days.

(21) Appl. No.: 10/803,686

(22) Filed: Mar. 18, 2004

(65) Prior Publication Data

US 2005/0093398 A1    May 5, 2005

(30) Foreign Application Priority Data

Oct. 30, 2003    (KR) ...................... 10-2003-0076274

(51) Int. Cl.
    *H01L 41/113*    (2006.01)
(52) U.S. Cl. ...................... 310/339; 310/324; 310/341; 310/343
(58) Field of Classification Search ................ 310/324, 310/339, 341, 343
    See application file for complete search history.

(56) References Cited

U.S. PATENT DOCUMENTS

| | | | |
|---|---|---|---|
| 6,750,596 B1* | 6/2004 | Kim et al. ................... | 310/339 |
| 2002/0043895 A1* | 4/2002 | Richards et al. ............ | 310/328 |
| 2005/0225213 A1* | 10/2005 | Richards et al. ............ | 310/339 |

* cited by examiner

*Primary Examiner*—Thomas M. Dougherty
(74) *Attorney, Agent, or Firm*—Jones Day

(57) ABSTRACT

A micro-electro-mechanical generator is provided with a housing having a heat source and a heat sink opposite to the heat source in the housing. An upper diaphragm and a lower diaphragm separated from the upper diaphragm by a constant distance are further provided, which are deformable between a first position where the lower diaphragm is thermally connected to the heat source while the upper diaphragm being thermally shut off from the heat sink, and a second position where the upper diaphragm is thermally connected to the heat sink while the lower diaphragm being thermally shut off from the heat source. Further, the upper diaphragm and the lower diaphragm are adapted to generate electric energy whenever being deformed. A fluid chamber charged with working fluid is further provided, which has an upper end defined by the upper diaphragm, a lower end defined by the lower diaphragm and a lateral wall formed between the upper end and the lower end and having a configuration causing that a volume of the fluid chamber in the second position is larger than that of the fluid chamber in the first position.

8 Claims, 4 Drawing Sheets

GENERATOR FOR USE WITH A MICRO SYSTEM HAVING DUAL DIAPHRAGMS

FIELD OF THE INVENTION

The present invention relates to generators for use in micro-electro-mechanical systems, and particularly to a micro-electro-mechanical generator designed to generate electricity, wherein dual diaphragms adapted to move in a manner of "bi-stable snapping action" and made of piezoelectric material are provided in an upper end and a lower end of a fluid chamber containing therein working fluid, with the diaphragms being maintained in a constant distance therebetween, so that the diaphragms move reciprocally in response to pressure change of the working fluid to provide electric energy whenever they are deformed due to the snapping actions.

BACKGROUND OF THE INVENTION

In a micro-electro-mechanical system (MEMS), a number of elements requiring electricity such as micro-pumps, microprocessors, micro-sensors, micro-actuators, and others are often integrated with one another. Although voltage and current required to drive these elements of the MEMS are very minute in magnitude compared to those consumed in macro-scaled systems, it is difficult to manufacture a power supply for the MEMS that can provide a proper level of the voltage and the current to those elements, as it must be very small in size.

Conventionally, supply of power for the MEMS has been achieved by using a fuel cell and, in some cases, a form of microwaves is used to supply necessary power to drive MEMS. More recently, a need has been recognized for a self power-generation system that semi-permanently generates electricity by using a temperature difference between the MEMS and its external environment, without necessitating a separate external power source. The self power-generation system triggered a study on "autonomous MEMS" which means a system operable semi-permanently in a condition isolated and independent from an external system.

In a known power generator for use in a macro-scaled system, a high temperature section and a low temperature section are provided. Working fluid travels between the two sections in such a manner that the fluid is heated in the high temperature section to work outside, then cooled by the low temperature section, and is returned to the high temperature section, repeatedly. However, it is difficult to apply this principle to a generator for the MEMS due to limitations in volume, a limitation in the relevant micro-fabrication technology, and influences to other electric circuit or electronic circuit components which have to be incorporated with the generator in the MEMS.

Thermoelectric modules have also been conventionally used for power generation in the MEMS. Power generation using the thermoelectric module adapts the Seebeck-effect wherein two different metals are joined to each other and a temperature difference is applied between them to induce a current.

The thermoelectric module is simple in configuration and even when it operates under a small temperature difference condition it can generate electricity commensurate to that small temperature difference. The thermoelectric module could be used to provide a generator suitable for applications of the MEMS as a reliable energy source with its advantages including operation with reduced noise, as it requires no working fluid or parts performing mechanical movement.

However, this type of generator has low operational efficiency and cannot generate sufficient level of electric power because suitable materials are not yet fully developed. For these reasons, this type of generator is not an appropriate power source for, e.g., a micro-pump for the MEMS.

Therefore, there is a need in the art for a micro-electro-mechanical generator capable of providing appropriate levels of electricity for MEMS.

SUMMARY OF THE INVENTION

It is, therefore, an object of the present invention to provide a micro-electro-mechanical generator which has increased level of electricity with enhanced efficiency and also provides stability compared to known MEMS generators.

Consistent with the foregoing objects, and in accordance with the invention as embodied broadly described herein, a micro-electro-mechanical generator is disclosed in one embodiment of the present invention, comprising: a housing having a heat source and a heat sink opposite to the heat source in the housing. The generator is further provided with an upper diaphragm and a lower diaphragm separated from the upper diaphragm by a constant distance, which are deformable between a first position where the lower diaphragm is thermally connected to the heat source while the upper diaphragm being thermally shut off from the heat sink, and a second position where the upper diaphragm is thermally connected to the heat sink while the lower diaphragm being thermally shut off from the heat source. The upper diaphragm and the lower diaphragm are adapted to generate electric energy whenever being deformed. Further, the generator further comprises a fluid chamber charged with working fluid, which has an upper end defined by the upper diaphragm, a lower end defined by the lower diaphragm and a lateral wall formed between the upper end and the lower end and having a configuration causing that a volume of the fluid chamber in the second position is larger than that of the fluid chamber in the first position.

According to one aspect of the inventive generator, either of the diaphragms is made of a piezoelectric material. Further, the diaphragm may have at its center a heat transfer member made of copper.

According to one aspect of the inventive generator, said thermal connection between the upper diaphragm and the heat sink or the thermal connection between the lower diaphragm and the heat source is achieved by conduction.

According to one aspect of the inventive generator, said working fluid is liquid.

According to one aspect of the inventive generator, the lateral wall is so inclined that the lateral wall is in a position more retreated from a center of the housing along a direction from the lower diaphragm to the upper diaphragm.

According to one aspect of the inventive generator, either of said diaphragms conducts a bi-stable snapping behavior in which it stably stays in only two positions of the first position and the second position.

The above and other objects and features of the present invention will become more apparent from the following description of the preferred embodiments given in conjunction with the accompanying drawings.

BRIEF DESCRIPTION OF DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PRESENT INVENTION

It will be readily understood that the components and steps of the present invention, as generally described and illustrated in the Figures herein and accompanying text, could be arranged and designed in a wide variety of different configurations while still utilizing the inventive concept. Thus, the following more detailed description of the preferred embodiments of the system and method of the present invention, as represented in FIGS. 1 through 4 and accompanying text, is not intended to limit the scope of the invention, as claimed, but it is merely representative of the presently preferred embodiments of the invention. The presently preferred embodiments of the invention will be best understood by reference to the drawings, wherein like parts or steps are designated by like numerals throughout.

Figure 1:
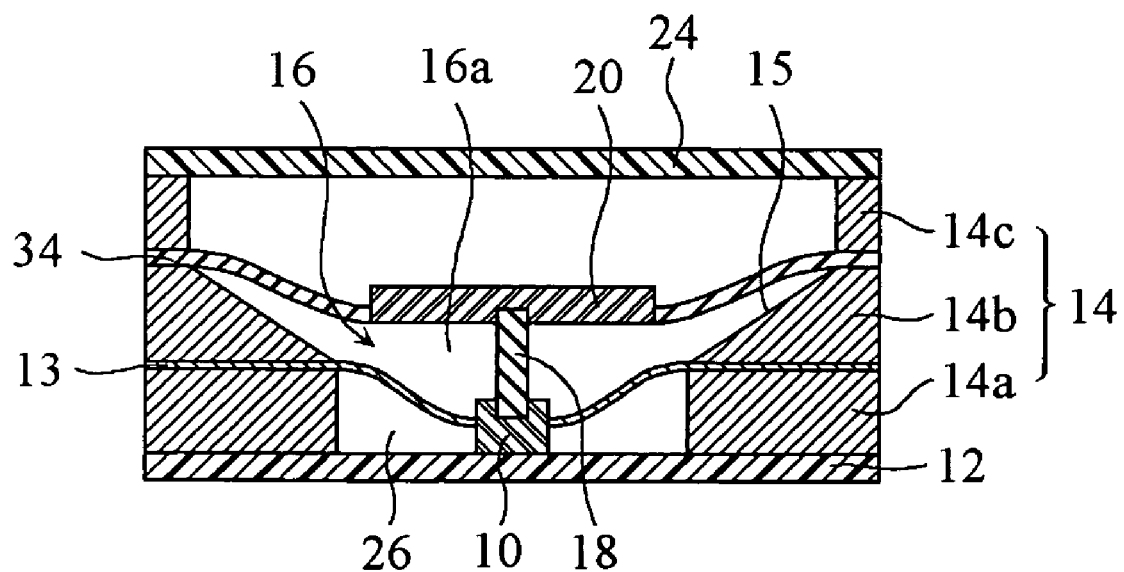
FIG. 1 illustrates a side sectional view of a micro-electro-mechanical generator in accordance with the present invention, wherein diaphragms are positioned at lower position.

The inventive micro-electro-mechanical generator 100 is shown in FIG. 1. As shown, micro-electro-mechanical generator 100 is provided with a heating plate 12, a fluid chamber 16, and a cooling plate 24.

Heating plate 12 is thermally connected to a heat source of high temperature (not shown) to have high temperature. Cooling plate 24 is thermally connected to a heat sink of low temperature (not shown), so that low temperature is maintained in cooling plate 24.

Heating plate 12, cooling plate 24, and thermal insulation wall 14 formed between heating plate 12 and cooling plate 24 define a closed space and serve as a housing. Thermal insulation wall 14 can be divided into three portions along a vertical direction, i.e., an upper wall 14c, an intermediate wall 14b, and a lower wall 14a. Upper wall 14c is in a position more retreated from a center of the housing compared to lower wall 14a.

Fluid chamber 16 is a space defined by a lower diaphragm 13, a lower heat transfer member 10, an upper diaphragm 34, an upper heat transfer member 20, and intermediate wall 14b of the thermal insulation wall 14. Fluid chamber 16 contains therein working fluid 16a. It is preferable to employ pentane or HFC-134a as the working fluid 16a.

Lower diaphragm 13 is held by thermal insulation wall 14 at its edges and has lower heat transfer member 10 assembled therewith at its center. Upper diaphragm 34 is also held by thermal insulation wall 14 and has upper heat transfer member 20 assembled therewith at its center.

Figure 2:
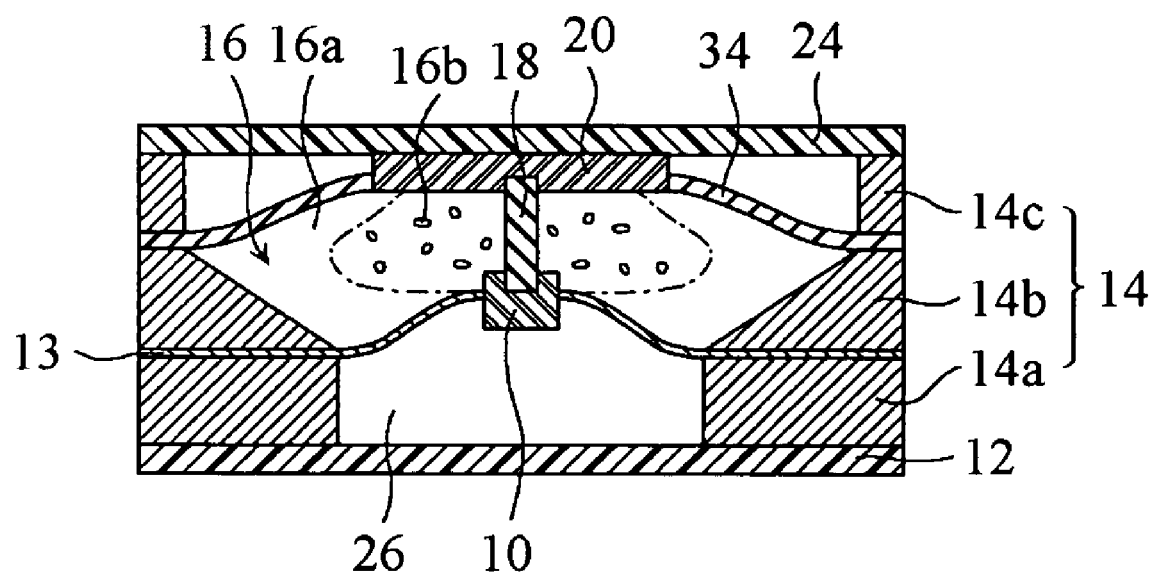
FIG. 2 depicts a side sectional view of the micro-electro-mechanical generator shown in FIG. 1, wherein the diaphragms are positioned at upper position.

As shown in FIGS. 1 and 2, lower diaphragm 13 and upper diaphragm 34 can be moved upwardly and downwardly, supporting lower heat transfer member 10 and upper heat transfer member 20 kept thereto, respectively, while constant distance is maintained between them by a connecting rod 18. In a preferred embodiment, diaphragms 13 and 34 move in a manner of "bi-stable snapping behavior," where they stably stay in only two positions shown in FIGS. 1 and 2, i.e., a lower position and an upper position. The bi-stable snapping behavior enables generator 100 to be stably operated. Hereinafter, the position of the diaphragms 13 and 34 in FIG. 1 will be referred as a "lower position", while the position of the diaphragms 13 and 34 in FIG. 2 being referred as a "upper position".

Figure 3:
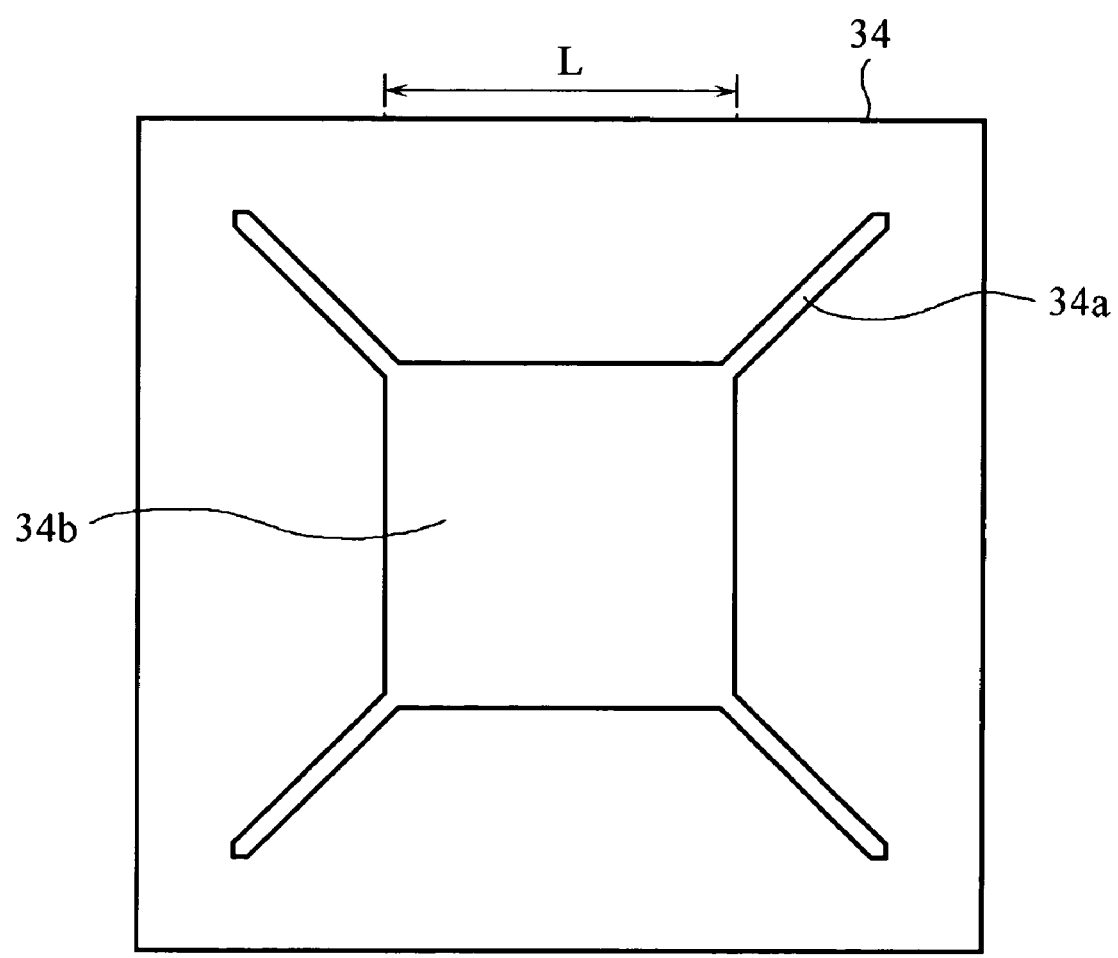
FIG. 3 illustrates a planar view of an upper diaphragm employed in the inventive generator.

FIG. 3 shows a preferred embodiment of upper diaphragm 34 with upper heat transfer member 20 removed therefrom. Upper diaphragm 34 has a cutout 34b of a rectangular shape with four sides of its length of L, in which upper heat transfer member 20 is received, and four slits 34a formed from four corners of cutout 34b along diagonal lines of the cutout 34b. Upper heat transfer member 20 to be received by cutout 34b has four sides each of which has a length larger than the length L of cutout 34b. Therefore, when assembling upper heat transfer member 20 into cutout 34b is completed by firstly widening cutout 34b by using four slits 34a and positioning upper heat transfer member 20 in cutout 34b to fix it to cutout 34b, upper diaphragm 34 is distorted in such a manner that a portion of upper diaphragm 34 adjacent to upper heat transfer member 20 protrudes upwardly or downwardly from a plane defined by the edge portion of upper diaphragm 34. In other words, the portion of upper diaphragm 34 is not in a same plane as that of the edge portion of upper diaphragm 34 (in a direction entering into/out of the paper in FIG. 3). With this configuration, upper diaphragm 34 can show the bi-stable snapping behavior. Slits 34a are needed to widen cutout 34b when upper heat transfer member 20 is positioned in cutout 34b in assembling process and they are filled up with other material at the end of the assembling process.

Though upper diaphragm 34 has a rectangular shape, it can be understood by those skilled in the art that it is not limited to a rectangular shape, and other shapes are available, such as a circular shape, closed polygonal, closed curve shape, and other shapes.

Diaphragms 13 and 34 are made of piezoelectric material, so that they generate electric energy whenever they are deformed due to changes in position between the lower position and the upper position.

Heating plate 12 transfers heat to lower heat transfer member 10 when lower diaphragm 13 is in the lower position, while heating plate 12 and lower heat transfer member 10 are in a close contact therewith. However, when lower diaphragm 13 is in the upper position, heating plate 12 and lower heat transfer member 10 are separated from each other and adiabatic condition is maintained between them. It is preferable that lower heat transfer member 10 be made of material having high heat transfer rate such as copper.

Upper heat transfer member 20 transfers heat to cooling plate 24 to be cooled when upper diaphragm 34 is in the upper position, and upper heat transfer member 20 and cooling plate 24 are in a close contact therewith. However, when upper diaphragm 34 is in the lower position, a substantial adiabatic condition is established between upper heat transfer member 20 and cooling plate 24.

Lateral portions of fluid chamber 16 are defined with thermal insulation wall 14 and, therefore, it is difficult for the heat transfer to occur through the lateral portions of fluid chamber 16.

Intermediate wall 14b of thermal insulation wall 14 has an inclined surface 15. Inclined surface 15 extends in a direction causing that the closed space of generator 100 becomes narrow along a downward direction of generator 100. In this configuration, volume of fluid chamber 16 when the diaphragms 13 and 34 are in the upper position is larger than that of the fluid chamber when diaphragms 13 and 34 are in the lower position.

Operations of the inventive micro-electro-mechanical generator constructed in this manner will be described with reference to FIGS. 1 and 2.

In a first step, the heat source (not shown) having high temperature continuously transfers heat to heating plate 12 by using known heat transfer methods, e.g., conduction, under a situation where diaphragms 13 and 34 are in the lower position, as shown in FIG. 1. The heat source may be various kinds of things, e.g., body heat from a human body, heat generated from components in a computer system, etc.

In a second step, heat transferred to heating plate 12 is transferred to lower heat transfer member 10 and the latter 10 heats working fluid 16a contained in fluid chamber 16. The volume of working fluid 16a heated by lower heat transfer member 10 starts to increase. During the increase of the volume, if working fluid 16a is liquid, portions of working fluid 16a are changed in phase from liquid to vapor 16b. At the moment, pressure within fluid chamber 16 is also increased.

In a third step, due to the increase of the volume and the pressure of fluid chamber 16, diaphragms 13 and 34 are urged to move into the upper position in which fluid chamber 16 has a larger volume than that in the lower position of diaphragms 13 and 34, and it can receive the increased volume of working fluid 16a. At last, both of diaphragms 13 and 34 are momentarily snapped into the upper position and the upper heat transfer member 20 is contacted to cooling plate 24. During this process, diaphragms 13 and 34 made of piezoelectric material generate electric energy.

In a last step, continued contact between upper heat transfer member 20 and cooling plate 24 of low temperature, fluid chamber 16 loses heat to be cooled and its volume and pressure starts to decrease. As a result, diaphragms 13 and 34 are returned to the lower position where fluid chamber 16 has smaller volume. During this process, the electric energy is generated in diaphragms 13 and 34. With these four steps, one cycle of operation is completed. After this, the first step starts again for another cycle.

It is preferable that connecting rod 18 is made of material having a lower heat transfer rate in order to shut off the heat transfer between heat transfer members 10 and 20.

The proportion of the area of lower heat transfer member 10 to the area of upper heat transfer member 20 can be determined to maximize the efficiency of micro-electro-mechanical generator 100. Further, in addition to copper, other material having a high heat transfer rate such as aluminum or gold can be available in constituting heat transfer members 10 and 20.

Figure 4:
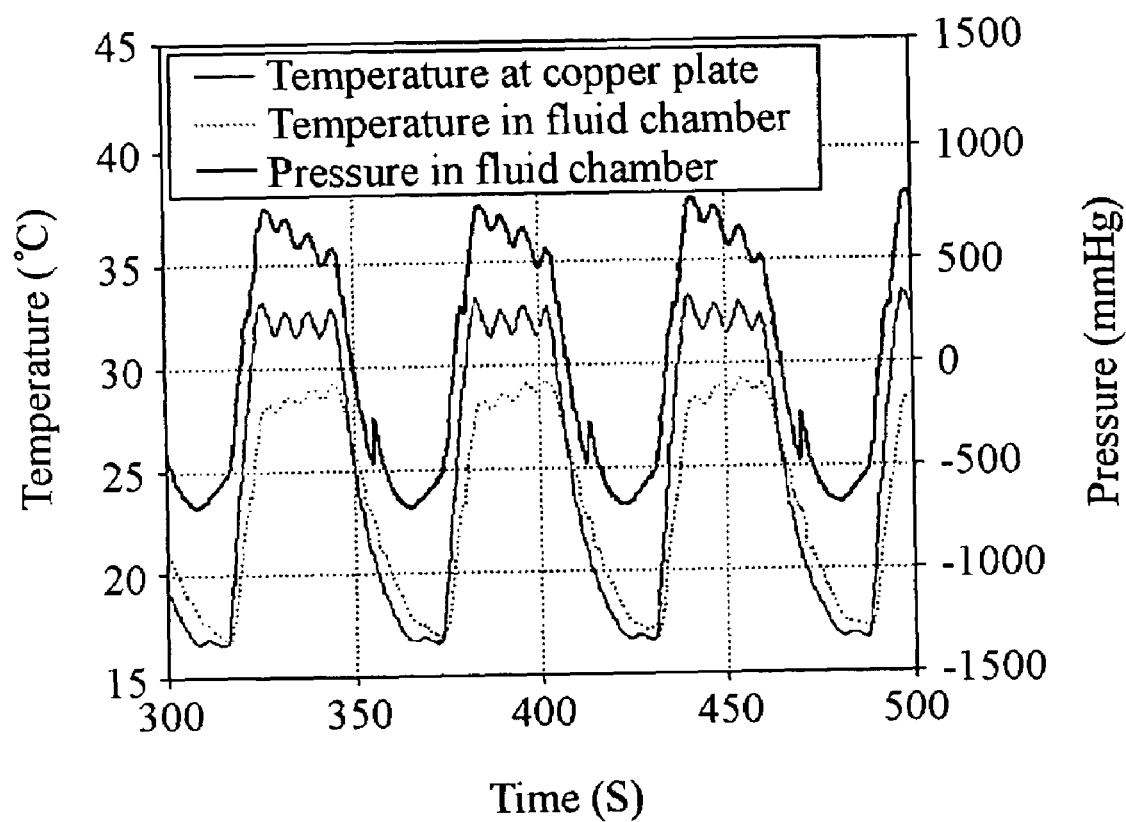
FIG. 4 is a graph showing relation with pressure in a fluid chamber, temperature in the fluid chamber, and temperature at a lower heat transfer member for heating in the present invention.

FIG. 4 is a graph showing relations between pressure in the fluid chamber, temperature of the fluid chamber and temperature at the lower heat transfer member made of copper, which is obtained from a test conducted by the applicant. It will be understood that peaks in the pressure curve (indicated with a thick solid line) shown near 355 second, 410 second, and 470 second mean generation of current during the movement of diaphragms 13 and 34 from the upper position to the lower position, and peaks in the pressure curve near 325 second, 385 second, 442 second and 498 second mean generation of current during the movement of diaphragms 13 and 34 from the lower position to the upper position.

Meanwhile, those skilled in the art can be understood that the inventive micro-electro-mechanical generator can be manufactured by using various known semi-conductor manufacturing technology.

The inventive micro-electro-mechanical generator may use waste heat from a power plant, a chemical plant, an incinerator, etc., as its energy source. When it is made in a miniature size, it may be applied as the main power source or supplementary power source for a mobile phone, a personal digital assistant (PDA), a lap top computer or a DNA chip, using for instance, body heat or solar heat as thermal energy source.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A micro-electro-mechanical generator, comprising:
a housing having a heat source and a heat sink opposite to the heat source in the housing;
an upper diaphragm and a lower diaphragm separated from the upper diaphragm by a constant distance, the upper diaphragm and the lower diaphragm deformable between a first position where the lower diaphragm is thermally connected to the heat source while the upper diaphragm being thermally shut off from the heat sink, and a second position where the upper diaphragm is thermally connected to the heat sink while the lower diaphragm being thermally shut off from the heat source, the upper diaphragm and the lower diaphragm adapted to generate electric energy whenever being deformed; and
a fluid chamber charged with working fluid, the fluid chamber having an upper end defined by the upper diaphragm, a lower end defined by the lower diaphragm and a lateral wall formed between the upper end and the lower end and having a configuration causing that a volume of the fluid chamber in the second position is larger than that of the fluid chamber in the first position.

2. The micro-electro-mechanical generator of claim 1, wherein at least one of said diaphragms is made of a piezoelectric material.

3. The micro-electro-mechanical generator of claim 2, wherein the diaphragm has at its center a heat transfer member made of copper.

4. The micro-electro-mechanical generator of claim 1, wherein said thermal connection between the upper diaphragm and the heat sink is achieved by conduction.

5. The micro-electro-mechanical generator of claim 1, wherein said fluid is liquid.

6. The micro-electro-mechanical generator of claim 1, wherein said heat source is body heat.

7. The micro-electro-mechanical generator of claim 1, wherein said lateral wall is so inclined that the lateral wall is in a position more retreated from a center of the housing along a direction from the lower diaphragm to the upper diaphragm.

8. The micro-electro-mechanical generator of claim 1, wherein either of said diaphragms conducts a bi-stable snapping behavior in which it stably stays in only two positions of the first position and the second position.

* * * * *